United States Patent
Goyal et al.

(10) Patent No.: US 8,548,509 B2
(45) Date of Patent: Oct. 1, 2013

(54) SYSTEM AND METHOD OF AUTOMATICALLY GENERATING AND SENDING TEXT MESSAGES

(75) Inventors: Amitabh Goyal, Bangalore (IN); Vikas Jagetiya, Bhilwara (IN); Prateek Gupta, Noida (IN)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 12/333,851

(22) Filed: Dec. 12, 2008

(65) Prior Publication Data

US 2010/0151827 A1    Jun. 17, 2010

(51) Int. Cl.
*H04W 4/00*    (2009.01)

(52) U.S. Cl.
USPC .......... 455/466; 455/415; 455/567; 455/412.1

(58) Field of Classification Search
USPC ............................. 455/466, 415, 567, 412.1
See application file for complete search history.

(56) References Cited

U.S. PATENT DOCUMENTS

| | | | |
|---|---|---|---|
| 6,334,053 B1 * | 12/2001 | Halonen | 455/412.1 |
| 7,162,027 B1 * | 1/2007 | Cannon et al. | 379/382 |
| 7,801,285 B2 * | 9/2010 | Makela et al. | 379/88.21 |
| 2003/0144038 A1 | 7/2003 | Pugliese | |
| 2008/0285735 A1 * | 11/2008 | Ravishankar et al. | 379/207.02 |
| 2009/0052637 A1 * | 2/2009 | Kao | 379/88.17 |
| 2009/0061824 A1 * | 3/2009 | Neelakantan et al. | 455/412.1 |
| 2009/0323911 A1 * | 12/2009 | Dury | 379/88.22 |

FOREIGN PATENT DOCUMENTS

| | | |
|---|---|---|
| CN | 101227516 A | 7/2008 |
| EP | 1331799 A1 | 7/2003 |
| EP | 1819137 A1 | 8/2007 |
| JP | 3040643 A | 2/1991 |
| JP | 2003051896 A | 2/2003 |
| JP | 2003274459 A | 9/2003 |
| JP | 2004015159 A | 1/2004 |
| JP | 2006157274 A | 6/2006 |
| JP | 2006324911 A | 11/2006 |
| JP | 2006345409 A | 12/2006 |
| JP | 2007081498 A | 3/2007 |
| WO | WO9931824 A1 | 6/1999 |

OTHER PUBLICATIONS

International Search Report and Written Opinion—PCT/US2009/067690—International Search Authority—European Patent Office, Apr. 1, 2010.

* cited by examiner

*Primary Examiner* — Nghi H Ly
(74) *Attorney, Agent, or Firm* — James T. Hagler

(57) ABSTRACT

A method of automatically generating text messages in response to a telephone call is disclosed and may include receiving an incoming telephone call at a text message capable device from a calling device, determining whether a text message engine within the text message capable device is enabled, automatically generating a text message when the text message engine is enabled and transmitting the text message to the calling device.

40 Claims, 3 Drawing Sheets

SYSTEM AND METHOD OF AUTOMATICALLY GENERATING AND SENDING TEXT MESSAGES

FIELD

The present invention generally relates to the operation of data networks, and more particularly, to systems and methods for sending text messages.

DESCRIPTION OF THE RELATED ART

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so resources on the public network can be made available to the wireless devices on the wireless network.

Many wireless devices are enabled to receive telephone calls and messages sent via the short message service (SMS) also known as text messages. Oftentimes, a user may wish to send a text message in response to a telephone call, but the user may be unable to send a text message due to being engaged in an activity that prohibits texting.

Therefore, what is needed is a system and method that operates to provide automatic text messaging.

SUMMARY OF THE DISCLOSURE

A method of automatically generating text messages in response to a telephone call is disclosed and may include receiving an incoming telephone call at a text message capable device from a calling device, determining whether a text message engine within the text message capable device is enabled, automatically generating a text message when the text message engine is enabled and transmitting the text message to the calling device.

The method may also include determining whether the incoming telephone call is answered when the text message engine is not enabled, determining whether a number of rings associated with the incoming telephone call satisfies a condition when the incoming telephone call is not answered, and enabling the text message engine when the number of rings satisfies the condition. The condition may be ring count.

In this particular aspect, the method may also include determining a current time associated with the incoming telephone call, determining contact information associated with the calling device, and determining user activity associated with a user of the text message capable device. In this aspect, the text message is generated at least partially based on the current time, the contact information, the user activity, or a combination thereof. The method may also include determining whether location information associated with the text message capable device is available and including the location information in the text message generated by the text message engine. Moreover, the method may include accessing a calendar stored in the text message capable device, determining a next available time to receive a phone call from the calendar, and including the next available time to receive a phone call in the text message with an indication to the calling device to call again at a future time. The method may also include including an indication to the calling device that the user of the text message capable device will return a telephone call to the calling device. In this particular aspect, the text message engine may be enabled by a button press, a softkey selection, or a combination thereof. Alternatively, the text message engine may be enabled at least partially based on GPS information associated with the text message capable device. Additionally, the text message engine may be enabled at least partially based on calendar information associated with the text message capable device.

In another aspect, a wireless device is disclosed and may include means for receiving an incoming telephone call at a text message capable device from a calling device, means for determining whether a text message engine within the text message capable device is enabled, means for automatically generating a text message when the text message engine is enabled, and means for transmitting the text message to the calling device. The wireless device may also include means for determining whether the incoming telephone call is answered when the text message engine is not enabled, means for determining whether a number of rings associated with the incoming telephone call satisfies a condition when the incoming telephone call is not answered, and means for enabling the text message engine when the number of rings satisfies the condition. In this aspect, the wireless device may further include means for determining a current time associated with the incoming telephone call, means for determining contact information associated with the calling device, and means for determining user activity associated with a user of the text message capable device. In this aspect, the text message may be generated at least partially based on the current time, the contact information, the user activity, or a combination thereof.

The wireless device may also include means for determining whether location information associated with the text message capable device is available and means for including the location information in the text message generated by the text message engine. Moreover, the wireless device may include means for accessing a calendar stored in the text message capable device, means for determining a next available time to receive a phone call from the calendar, and means for including the next available time to receive a phone call in the text message with an indication to the calling device to call again at a future time. The wireless device may also include means for including an indication to the calling device that the user of the text message capable device will return a telephone call to the calling device.

In this aspect of a wireless device, the text message engine may be enabled by a button press, a softkey selection, or a combination thereof. Also, the text message engine may be enabled at least partially based on GPS information associated with the text message capable device. Further, the text message engine may be enabled at least partially based on calendar information associated with the text message capable device.

In yet another aspect, a text message capable device is disclosed and may include a processor that is operable to receive an incoming telephone call from a calling device, determine whether a text message engine within the text message capable device is enabled, automatically generate a text message when the text message engine is enabled, and transmit the text message to the calling device. The processor may be further operable to determine whether the incoming telephone call is answered when the text message engine is not enabled, determine whether a number of rings associated with the incoming telephone call satisfies a condition when the incoming telephone call is not answered, and enable the text message engine when the number of rings satisfies the condition.

In this aspect, the processor may be further operable to determine a current time associated with the incoming telephone call, determine contact information associated with the calling device, and determine user activity associated with a user of the text message capable device. The text message may be generated at least partially based on the current time, the contact information, the user activity, or a combination thereof. Moreover, the processor may be operable to determine whether location information associated with the text message capable device is available and include the location information in the text message generated by the text message engine.

In this aspect, the processor may also be operable to access a calendar stored in the text message capable device, determine a next available time to receive a phone call from the calendar, and include the next available time to receive a phone call in the text message with an indication to the calling device to call again at a future time. The processor may be operable to include an indication to the calling device that the user of the text message capable device will return a telephone call to the calling device. In this aspect, the text message engine may be enabled by a button press, a softkey selection, or a combination thereof. Further, the text message engine may be enabled at least partially based on GPS information associated with the text message capable device. Also, the text message engine may be enabled at least partially based on calendar information associated with the text message capable device.

In still another aspect, a computer program product is disclosed and may include a computer-readable medium. The computer-readable medium may include at least one instruction for receiving an incoming telephone call at a text message capable device from a calling device, at least one instruction for determining whether a text message engine within the text message capable device is enabled, at least one instruction for automatically generating a text message when the text message engine is enabled, and at least one instruction for transmitting the text message to the calling device. Moreover, the computer-readable medium may include at least one instruction for determining whether the incoming telephone call is answered when the text message engine is not enabled, at least one instruction for determining whether a number of rings associated with the incoming telephone call satisfies a condition when the incoming telephone call is not answered, and at least one instruction for enabling the text message engine when the number of rings satisfies the condition. The computer-readable medium may also include at least one instruction for determining a current time associated with the incoming telephone call, at least one instruction for determining contact information associated with the calling device, and at least one instruction for determining user activity associated with a user of the text message capable device. In this aspect, the text message may be generated at least partially based on the current time, the contact information, the user activity, or a combination thereof.

The computer-readable medium may further include at least one instruction for determining whether location information associated with the text message capable device is available and at least one instruction for including the location information in the text message generated by the text message engine. Also, the computer-readable medium may include at least one instruction for accessing a calendar stored in the text message capable device, at least one instruction for determining a next available time to receive a phone call from the calendar, and at least one instruction for including the next available time to receive a phone call in the text message with an indication to the calling device to call again at a future time.

In this aspect, the computer-readable medium may also include at least one instruction for including an indication to the calling device that the text message capable device will return a telephone call to the calling device. The text message engine may be enabled by a button press, a softkey selection, or a combination thereof. The text message engine may also be enabled at least partially based on GPS information associated with the text message capable device. Further, the text message engine may be enabled at least partially based on calendar information associated with the text message capable device. eric

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
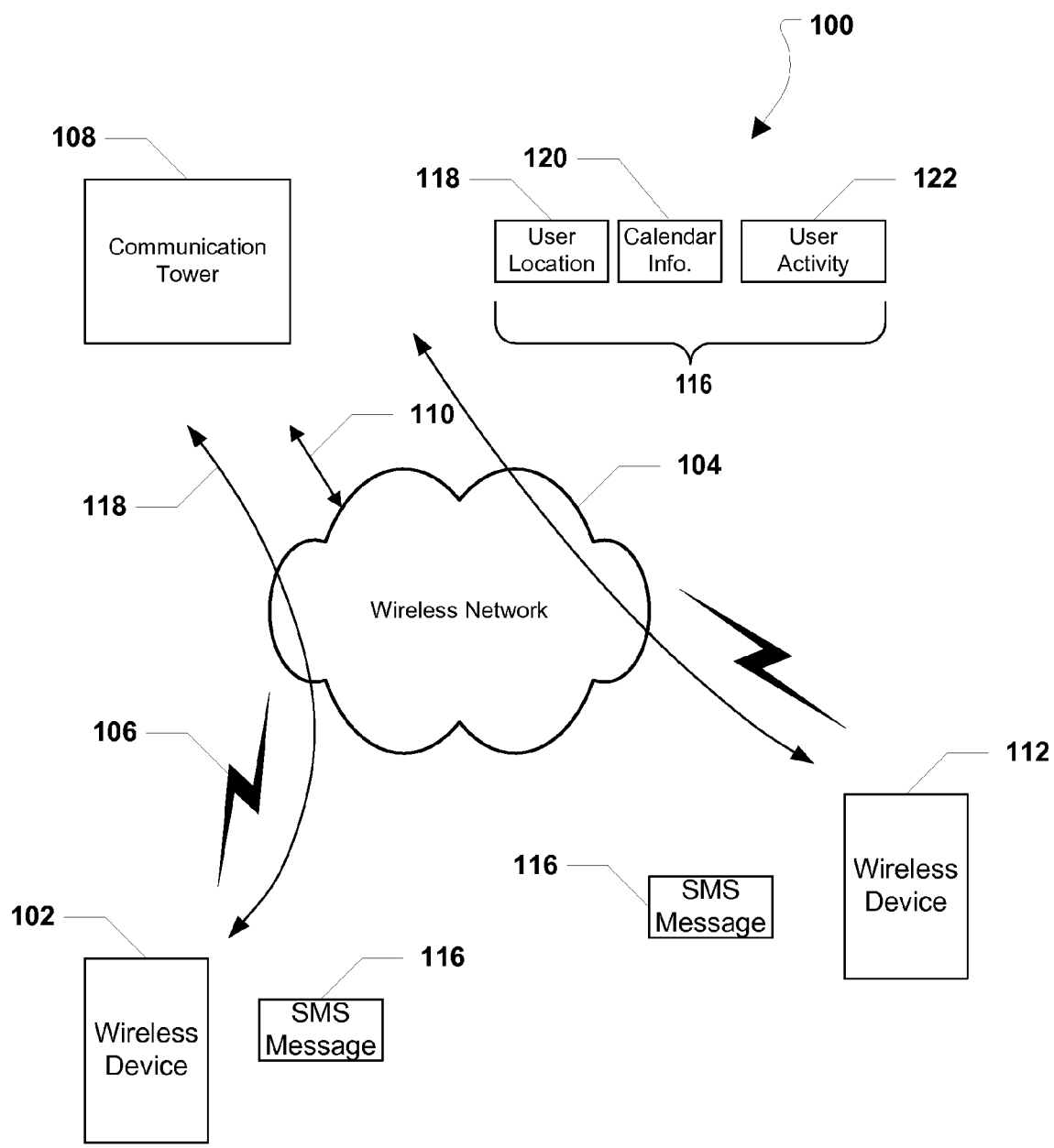
FIG. 1 is a diagram of a data network.

FIG. 1 shows a data network 100. The network 100 may include a first wireless device 102 that communicates with a wireless data network 104 via a wireless communication channel 106. The first wireless device 102 may be a text message capable device that may be used to transmit messages via short message services (SMS), via enhanced messaging services (EMS), via multimedia messaging services (MMS), via the short message peer-to-peer protocol (SMPP), or any other messaging service well known in the art.

The network 100 may also include a communication tower 108 that operates to provide wireless connectivity to the first wireless device 102 and other entities in communication with the network 104. The communication tower 108 may be coupled to the network 104 by a link 110, which may be any type of wired or wireless link. The link 110 may be based on any known means for wireless communication between the first wireless device 102 and the network 104. The link 110 may communicate content. In one aspect, the link 110 may be implemented using code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.1a/b/n ("WiFi"), World Interoperability for Microwave Access ("WiMAX"), or other wireless communication technology.

The link 110 may be provided by a wireless network operator or a third party. The wireless network operator owns the infrastructure and any licenses to operate the wireless communication technology. Examples of wireless network operators in the United States are Verizon, Sprint, and AT&T. However, some wireless technologies are operated by the third party which owns infrastructure and may not require a license to operate certain wireless technologies (e.g., WiFi). For instance, the link 110 could be a WiFi hotspot at a local coffee shop (e.g., Starbucks).

In one aspect, the wireless device 102 may be a wireless telephone, and the communication tower 108 may be part of a nationwide telecommunications network that provides wireless connectivity to the device 102. A second wireless device 112 may also be coupled to the network 104.

In a particular aspect, the communication tower 108 may transmit and receive telephone calls, text messages, etc. to and from the first wireless device 102, the second wireless device 112, or a combination thereof. As discussed herein, the first wireless device 102, the second wireless device 112, or a combination thereof may automatically generate and transmit one or more SMS messages 116. The automatic SMS message 116 may include automatically generated text that may include user location data 118, user calendar data 120, user activity data 122, some other user related information, or a combination thereof.

Figure 2:
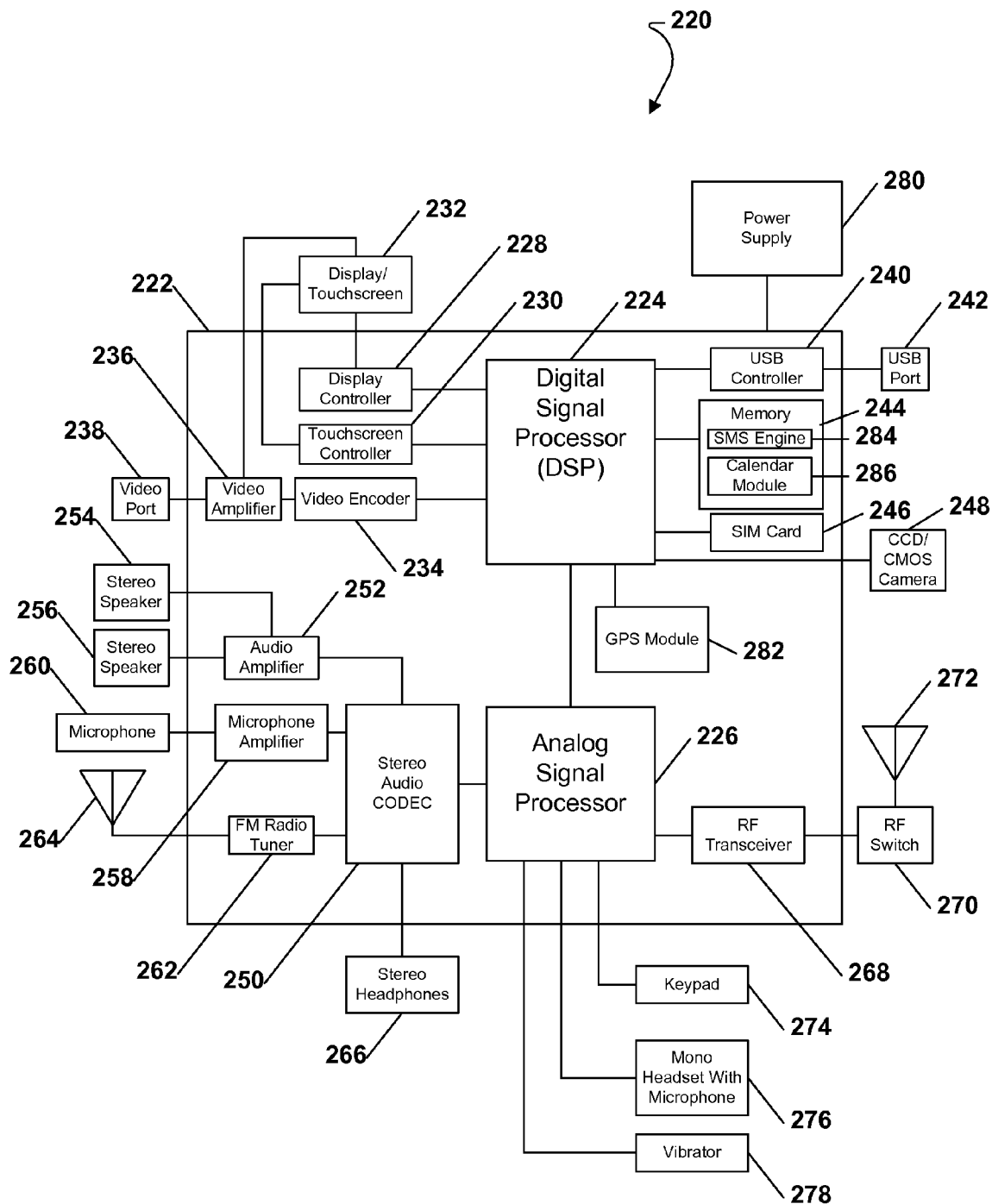
FIG. 2 is a diagram of a telephone.

Referring to FIG. 2, an exemplary, non-limiting aspect of a wireless device is shown and is generally designated 220. As shown, the wireless device 220 includes an on-chip system 222 that includes a digital signal processor 224 and an analog signal processor 226 that are coupled together. As illustrated in FIG. 2, a display controller 228 and a touchscreen controller 230 are coupled to the digital signal processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system(s) committee (NTSC) encoder, is coupled to the digital signal processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital signal processor 224. Also, a USB port 242 is coupled to the USB controller 240. A memory 244 and a subscriber identity module (SIM) card 246 can also be coupled to the digital signal processor 224. Further, as shown in FIG. 2, a digital camera 248 can be coupled to the digital signal processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 can be coupled to the analog signal processor 226. Moreover, an audio amplifier 252 can coupled to the stereo audio CODEC 250. In an exemplary aspect, a first stereo speaker 254 and a second stereo speaker 256 are coupled to the audio amplifier 252. FIG. 2 shows that a microphone amplifier 258 can be also coupled to the stereo audio CODEC 250. Additionally, a microphone 260 can be coupled to the microphone amplifier 258. In a particular aspect, a frequency modulation (FM) radio tuner 262 can be coupled to the stereo audio CODEC 250. Also, an FM antenna 264 is coupled to the FM radio tuner 262. Further, stereo headphones 266 can be coupled to the stereo audio CODEC 250.

FIG. 2 further indicates that a radio frequency (RF) transceiver 268 can be coupled to the analog signal processor 226. An RF switch 270 can be coupled to the RF transceiver 268 and an RF antenna 272. As shown in FIG. 2, a keypad 274 can be coupled to the analog signal processor 226. Also, a mono headset with a microphone 276 can be coupled to the analog signal processor 226. Further, a vibrator device 278 can be coupled to the analog signal processor 226. FIG. 2 also shows that a power supply 280 can be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source.

As shown in FIG. 2, the wireless device 220 may also include a global positioning system (GPS) module 282. The GPS module 282 may be used to determine the location of the wireless device 220. Further, the GPS module 282 may be used to determine whether the wireless device 220 is in motion by determining successive location information. Also, based on the successive location information the rate at which the wireless device 220 is moving may be determined.

FIG. 2 also shows that the wireless device 220 may also include an SMS engine 284 stored within the memory 244 and accessible to the digital signal processor 224. The SMS engine 284 may be a software module operable to automatically generate SMS messages in response to incoming telephone calls received at the wireless device 220. In a particular embodiment, the SMS messages may include messages sent via enhanced messaging services (EMS), via multimedia messaging services (MMS), via the short message peer-to-peer protocol (SMPP), or any other messaging service well known in the art.

Figure 3:
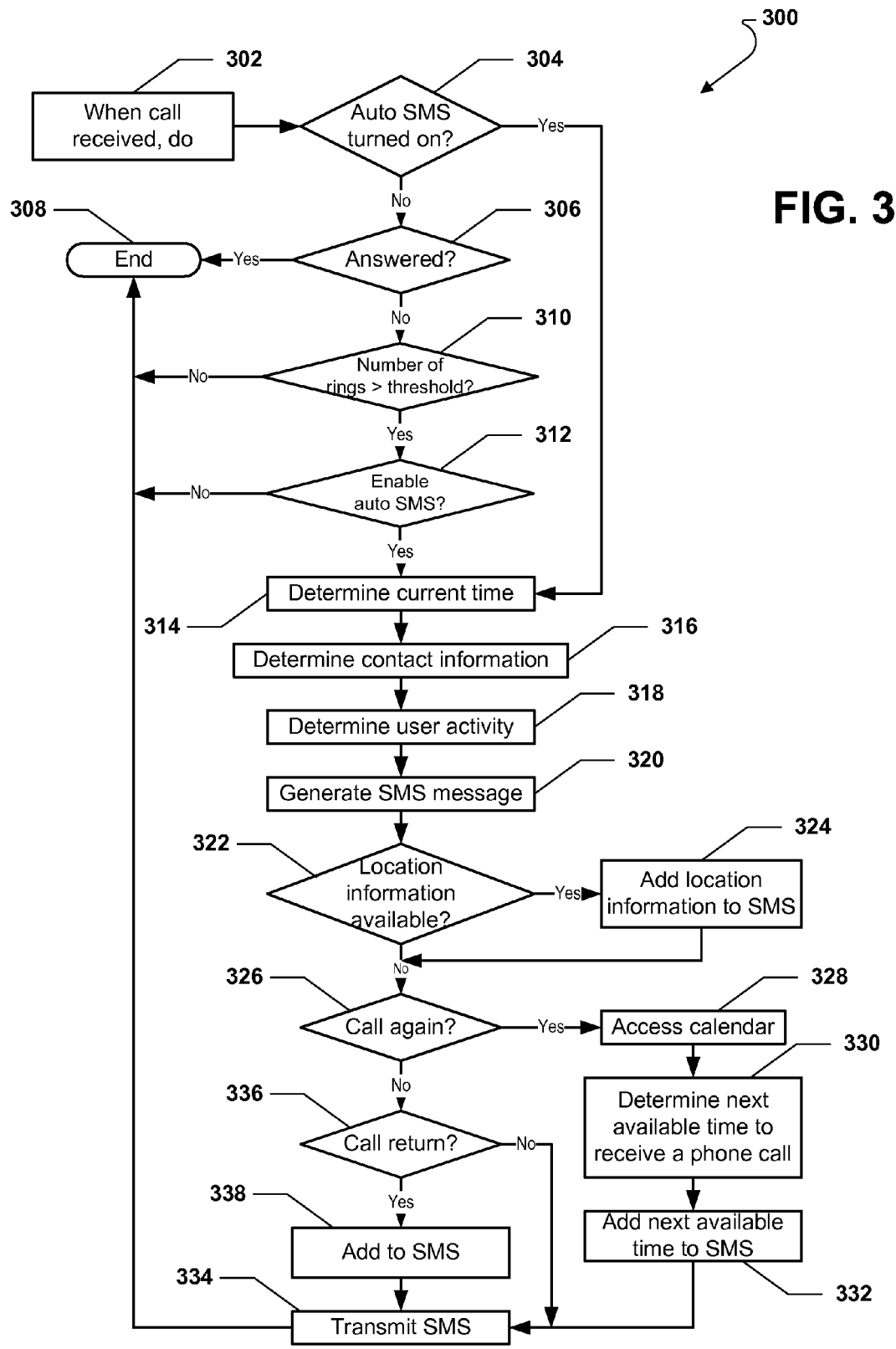
FIG. 3 is a flowchart illustrating a method of automatically generating and sending text messages.

In a particular aspect, the SMS engine 284 may perform one or more of the method steps described in conjunction with FIG. 3 in order to automatically generate and transmit one or more text messages in response to incoming telephone calls at the wireless device 220. As such, the SMS engine 284 may serve as a means for performing one or more of the method steps described in conjunction with FIG. 3. The SMS engine 284 may use information from the GPS module 282 in order to automatically generate SMS messages when the GPS module 282 indicates that the wireless device 220 is rapidly moving, e.g., when the user of the wireless device 220 is driving.

FIG. 2 also shows that the wireless device 220 may also include a calendar module 286 stored in the memory 244 of the wireless device 220. The calendar module 286 may be utilized by the user of the wireless device 220 in order to track meetings, appointments, etc. The SMS engine 284 may use the information in the calendar module 286 to automatically generate SMS messages when the calendar module 286 indicates that the user is in a meeting or at an appointment and may not be available to receive an incoming call.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset with the microphone 276, the vibrator device 278, and the power supply 280 are external to the on-chip system 222.

In a particular aspect, one or more of the method steps described herein may be stored in the memory 244 as computer program instructions. These instructions may be executed by a processor 224, 226 in order to perform the methods described herein. Further, the processors, 224, 226, the memory 244, the instructions stored therein, or a combination thereof may serve as a means for performing one or more of the method steps described herein.

Referring to FIG. 3, a method 300 of automatically generating and transmitting SMS messages, or text messages, at a wireless device is shown and commences at block 302 with a do loop in which when a call is received at an SMS device, the following steps are performed. At decision block 304, the wireless device may determine whether an automatic SMS engine 284 within the wireless device is turned on. The SMS engine 284 may be turned on by the user. For instance the user may select a particular soft key displayed at the wireless device or by pressing a button on the wireless device.

Alternatively, the SMS engine 284 may be turned on automatically if the SMS engine 284 determines that the wireless device is rapidly moving indicating that the user may be driving. The SMS engine 284 may determine that the wireless device is moving based on information received from a GPS module accessible to the SMS engine 284. In another aspect, the SMS engine 284 may be turned on automatically based on the user's calendar module 286 stored in the wireless device. For example, if the user has indicated that he or she will be in a meeting at a particular time, the SMS engine 284 may automatically be turned on during the meeting in order to avoid interruption or distraction.

If the automatic SMS engine 284 is not turned on, the method 300 may proceed to decision block 306 and the SMS engine 284 may determine if the incoming call is answered. If the call is answered, the method 300 may proceed to block 308 and end as shown. If the telephone call is not answered, the method 300 may move to decision block 310 and determine if a number of rings satisfies a condition. In an aspect, this determination may include determining whether the number of rings is greater than a predetermined, or user-defined, threshold. For example, the threshold may be one ring, two rings, three rings, four rings, five rings, or any other number of rings. If the number of rings is not greater than the threshold, the method 300 may end at block 308. If the number of rings exceeds the threshold, the method 300 may proceed to decision block 312. While a number of rings being counted toward a threshold is shown, one skilled in the art may utilize a decrementing counter, a timer, a flag, etc.

At decision block 312, the SMS engine 284 may determine whether to generate and transmit a text message to the calling device. The SMS engine 284 may determine the capabilities of the calling device and based on that determination, the SMS engine 284 may decide not to generate and transmit a text message to the calling device. In a particular aspect, the calling device may not have text capabilities and as such, the SMS engine 284 may not automatically generate a text message. The determination of the capabilities of the calling device may be based on the number associated with the calling device. For example, the calling device may be a land line coupled to a telephone that is not capable of receiving text messages.

In one aspect, the SMS engine 284 may use a telephone number, an electronic serial number (ESN), a mobile equipment identifier (MEID), an international mobile equipment identifier (IMEI), an international mobile subscriber identity (IMSI), a mobile subscriber ISDN number (MSISDN), or some other unique identifier in order to identify the calling device and use the identity of the calling device to determine the capabilities of the calling device. For example, the SMS engine 284 may access a database within the wireless device in order to identify the calling device. Alternatively, the SMS engine 284 may access an external database in order to identify the calling device.

Returning to decision block 312, if the SMS engine 284 decides to automatically generate and transmit a text message to the calling device, the method 300 may proceed to block 314. Block 314 of the method 300 may also be reached if the automatic SMS engine 284 is turned on as determined at decision block 304. At block 314, the SMS engine 284 may determine the current time at the wireless device. At block 316, the SMS engine 284 may determine the contact information, if available, that is associated with the calling device telephone number and stored at the wireless device. The SMS engine 284 may compare the identifier of the calling device to a list of stored devices in order to determine the contact information. The list of stored devices may be part of an address book or contact list stored in the wireless device. Moving to block 318, the SMS engine 284 may determine the user activity, e.g., based on the user calendar, based on GPS information, some other information, or a combination thereof. The user activity may include the type of activity that the user is currently engaged in and may include driving, attending a meeting, etc.

At block 320, at least partially based on the current time, the contact information, the user activity, or a combination thereof, the SMS engine 284 may automatically generate a text message. At decision block 322, the SMS engine 284 may determine whether location information is available. If location information is available, the method 300 may continue to block 324 and the SMS engine 284 may add the location information to the text message. Thereafter, the method 300 may proceed to decision block 326.

On the other hand, at decision block 322, if location information is not available, the method 300 may also proceed to decision block 326. At decision block 326, the SMS engine 284 may determine whether to indicate to the calling device to call again. This may be based on one or more user preferences or settings. If so, the method 300 may move to block 328 and the SMS engine 284 may access the user calendar stored with the wireless device. Further, at block 330 the SMS engine 284 may use the calendar to determine the next available time to receive a phone call from the calling device. At block 332, the SMS engine 284 may add the next available time to the text message with an instruction to the calling device, or the user of the calling device, to call at the specified time. Thereafter, at block 334, the SMS engine 284 may transmit the text message to the calling device. The method 300 may then end at block 308.

Returning to decision block 326, if the SMS engine 284 determines not to indicate to the calling device to call again, the method 300 may proceed to decision block 336. At decision block 336, the SMS engine 284 may determine whether the called device will return the call to the called device. This may be based on one or more user preferences or settings. If the SMS engine 284 determines that the called device will not return a call to the called device, the method 300 may proceed to block 334 and continue as described. If the SMS engine 284 determines that the called device will return a call to the called device, the method 300 may continue to block 338. At block 338, the SMS engine 284 may add an indication to the text message that the user of the called device will call the calling the device at his or her earliest convenience. The method 300 may then move to block 334 and continue as described herein.

It is to be understood that the method steps described herein need not necessarily be performed in the order as described. Further, words such as "thereafter," "then," "next," etc. are not intended to limit the order of the steps. These words are simply used to guide the reader through the description of the method steps.

One or more aspects described herein provide a system and method for automatically generating text messages in response to incoming telephone calls that the user may not be able to answer, e.g., due to a meeting, while driving, etc. The automatic text message may be tailored to the specific person calling. For example, if the person calling is a family member more personal information about the current status of the called user may be included in the automatic response. Conversely, if the person calling is a business associate, the automatic text message may be very formal and not indicate any personal information about the called user. If the person calling is a close friend, the automatic text message may include a joke or some other funny comment.

Further, the automatic text message may include information taken from the called user's calendar stored in the called device. For instance, stored in the calendar module. Such information may include an appropriate time to call again. The automatic text message may include a video response, a phone response, a voice response, text, or a combination thereof.

In a particular aspect, a message may include a statement regarding the called party's current activities. For example, the text message may state, "I'm driving. I will call you when I'm at my destination." Or, the text message may state, "I'm in a meeting. I will call back after it is finished." Further, the text message may state, "I'm busy please call back at 5:30." Regardless, these text messages may be automatically generated by an SMS engine 284 within the called device based on the user's activities determined from the user's calendar or from information received from the GPS module 282 within the called device.

In one or more exemplary aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations can be made therein without departing from the spirit and scope of the present invention, as defined by the following claims.

What is claimed is:

1. A method of automatically generating text messages in response to an incoming telephone call, the method comprising:
   receiving the incoming telephone call at a text message capable wireless device from a calling device;
   determining whether an automatic text message engine within the text message capable wireless device is enabled;
   determining whether a user of the text message capable wireless device is unavailable to receive the incoming telephone call;
   enabling the automatic text message engine in response to determining that the automatic text message engine is not enabled and that the user of the text message capable wireless device is unavailable to receive the incoming telephone call;
   determining whether the calling device is capable of receiving a text message; and
   automatically generating a text message and transmitting the text message to the calling device in response to determining that the calling device is capable of receiving the text message and that the automatic text message engine is enabled.

2. The method of claim 1, further comprising:
   determining a current time associated with the incoming telephone call;

determining contact information associated with the calling device; and determining user activity associated with the user of the text message capable wireless device.

3. The method of claim 2, wherein the text message is generated at least partially based on the current time, the contact information, the user activity, or a combination thereof.

4. The method of claim 3, further comprising:
determining whether location information associated with the text message capable wireless device is available; and
including the location information in the text message generated by the automatic text message engine.

5. The method of claim 3, further comprising:
accessing a calendar stored in the text message capable wireless device;
determining, based on the calendar, a next available time for the user to receive a phone call from the calendar; and
including the determined next available time for the user to receive a phone call in the text message with an indication to the calling device to call again at a future time.

6. The method of claim 3, further comprising:
including an indication to the calling device that the user of the text message capable wireless device will return a telephone call to the calling device.

7. The method of claim 1, wherein the automatic text message engine is enabled by a button press, a softkey selection, or a combination thereof.

8. The method of claim 1, wherein determining whether the user of the text message capable wireless device is unavailable to receive the incoming telephone call is at least partially based on GPS information associated with the text message capable wireless device.

9. The method of claim 1, wherein determining whether the user of the text message capable wireless device is unavailable to receive the incoming telephone call is at least partially based on calendar information associated with the text message capable wireless device.

10. The method of claim 1 further comprising:
determining whether the incoming telephone call is answered;
determining whether a number of rings associated with the incoming telephone call satisfies a condition when the incoming telephone call is not answered; and
performing the operation of determining whether the user is unavailable to receive when the number of rings satisfies the condition.

11. A text message capable wireless device, comprising:
means for receiving an incoming telephone call from a calling device;
means for determining whether an automatic text message engine within the text message capable wireless device is enabled; and
means for determining whether a user of the text message capable wireless device is unavailable to receive the incoming telephone call;
means for enabling the automatic text message engine in response to determining that the automatic text message engine is not enabled and that the user of the text message capable wireless device is unavailable to receive the incoming telephone call;
means for determining whether the calling device is capable of receiving a text message; and
means for automatically generating a text message and means for transmitting the text message to the calling device in response to determining that the calling device is capable of receiving the text message and that the automatic text message engine is enabled.

12. The text message capable wireless device of claim 11, further comprising:
means for determining a current time associated with the incoming telephone call;
means for determining contact information associated with the calling device; and
means for determining user activity associated with the user of the text message capable wireless device.

13. The text message capable wireless device of claim 12, wherein the text message is generated at least partially based on the current time, the contact information, the user activity, or a combination thereof.

14. The text message capable wireless device of claim 13, further comprising:
means for determining whether location information associated with the text message capable wireless device is available; and
means for including the location information in the text message generated by the automatic text message engine.

15. The text message capable wireless device of claim 13, wherein the text message capable wireless device further comprises:
means for accessing a calendar stored in the text message capable wireless device;
means for determining, based on the calendar, a next available time for the user to receive a phone call; and
means for including the determined next available time for the user to receive a phone call in the text message with an indication to the calling device to call again at a future time.

16. The text message capable wireless device of claim 13, further comprising:
means for including an indication to the calling device that the user of the text message capable wireless device will return a telephone call to the calling device.

17. The text message capable wireless device of claim 11, wherein the automatic text message engine is enabled by a button press, a softkey selection, or a combination thereof.

18. The text message capable wireless device of claim 11, wherein determining whether a user of the text message capable wireless device is unavailable to receive the incoming telephone call is at least partially based on GPS information associated with the text message capable wireless device.

19. The text message capable wireless device of claim 11, wherein determining whether a user of the text message capable wireless device is unavailable to receive the incoming telephone call is at least partially based on calendar information associated with the text message capable wireless device.

20. The text message capable wireless device of claim 11, further comprising:
means for determining whether the incoming telephone call is answered;
means for determining whether a number of rings associated with the incoming telephone call satisfies a condition when the incoming telephone call is not answered; and
wherein the means for determining whether the user is unavailable to receive is performed when the number of rings satisfies the condition.

21. A text message capable wireless device, comprising:
a processor, wherein the processor is operable to:
receive an incoming telephone call from a calling device;

determine whether an automatic text message engine within the text message capable wireless device is enabled;

determine whether a user of the text message capable wireless device is unavailable to receive the incoming telephone call;

enable an automatic text message engine in response to determining that the automatic text engine is disabled and that the user of the text message capable wireless device is unavailable to receive the incoming telephone call;

determine whether the calling device is capable of receiving a text message; and automatically generate a text message and transmit the text message to the calling device in response to determining that the calling device is capable of receiving the text message and that the automatic text message engine is enabled.

22. The text message capable wireless device of claim 21, wherein the processor is further operable to:

determine a current time associated with the incoming telephone call;

determine contact information associated with the calling device; and determine user activity associated with the user of the text message capable wireless device.

23. The text message capable wireless device of claim 22, wherein the text message is generated at least partially based on the current time, the contact information, the user activity, or a combination thereof.

24. The text message capable wireless device of claim 23, wherein the processor is further operable to:

determine whether location information associated with the text message capable wireless device is available; and include the location information in the text message generated by the automatic text message engine.

25. The text message capable wireless device of claim 23, wherein the processor is further operable to:

access a calendar stored in the text message capable wireless device;

determine, based on the calendar, a next available time for the user to receive a phone call; and include the determined next available time for the user to receive a phone call in the text message with an indication to the calling device to call again at a future time.

26. The text message capable wireless device of claim 23, wherein the processor is further operable to:

include an indication to the calling device that the user of the text message capable wireless device will return a telephone call to the calling device.

27. The text message capable wireless device of claim 21, wherein the automatic text message engine is enabled by a button press, a softkey selection, or a combination thereof.

28. The text message capable wireless device of claim 21, wherein the determination of whether a user of the text message capable wireless device is unavailable to receive the incoming telephone call is at least partially based on GPS information associated with the text message capable wireless device.

29. The text message capable wireless device of claim 21, wherein the determination of whether a user of the text message capable wireless device is unavailable to receive the incoming telephone call is at least partially based on calendar information associated with the text message capable wireless device.

30. The text message capable wireless device of claim 21, wherein the processor is further operable to:

determine whether the incoming telephone call is answered;

determine whether a number of rings associated with the incoming telephone call satisfies a condition when the incoming telephone call is not answered; and perform the operation of determining whether the user is unavailable to receive when the number of rings satisfies the condition.

31. A non-transitory computer-readable storage medium having stored thereon processor-executable instructions configured to cause a processor of a text message capable wireless device to perform operations comprising:

receiving an incoming telephone call at a text message capable wireless device from a calling device;

determining whether an automatic text message engine within the text message capable wireless device is enabled;

determining whether a user of the text message capable wireless device is unavailable to receive the incoming telephone call enabling the automatic text message engine in response to determining that the automatic text message engine is not enabled and that the user of the text message capable wireless device is unavailable to receive the incoming telephone call;

determining whether the calling device is capable of receiving a text message; and automatically generating a text message and transmitting the text message to the calling device in response to determining that the calling device is capable of receiving a text message and that the automatic text message engine is enabled.

32. The non-transitory computer-readable storage medium of claim 31, wherein the stored processor-executable instructions are configured to cause a processor of a text message capable wireless device to perform operations further comprising:

determining a current time associated with the incoming telephone call;

determining contact information associated with the calling device; and determining user activity associated with the user of the text message capable wireless device.

33. The non-transitory computer-readable storage medium claim 32, wherein the text message is generated at least partially based on the current time, the contact information, the user activity, or a combination thereof.

34. The non-transitory computer-readable storage medium of claim 33, wherein the stored processor-executable instructions are configured to cause a processor of a text message capable wireless device to perform operations further comprising:

determining whether location information associated with the text message capable wireless device is available; and including the location information in the text message generated by the automatic text message engine.

35. The non-transitory computer-readable storage medium product of claim 33, wherein the stored processor-executable instructions are configured to cause a processor of a text message capable wireless device to perform operations further comprising:

accessing a calendar stored in the text message capable wireless device;

determining, based on the calendar, a next available time for the user to receive a phone call; and including the determined next available time for the user to receive a phone call in the text message with an indication to the calling device to call again at a future time.

36. The non-transitory computer-readable storage medium of claim 31, wherein the stored processor-executable instructions are configured to cause a processor of a text message capable wireless device to perform operations further comprising:

including an indication to the calling device that the user of the text message capable wireless device will return a telephone call to the calling device.

37. The non-transitory computer-readable medium of claim 31, wherein the automatic text message engine is enabled by a button press, a softkey selection, or a combination thereof.

38. The non-transitory computer-readable medium claim 31, wherein determining whether a user of the text message capable wireless device is unavailable is at least partially based on GPS information associated with the text message capable wireless device.

39. The non-transitory computer-readable medium claim 31, wherein determining whether a user of the text message capable wireless device is unavailable is at least partially based on calendar information associated with the text message capable wireless device.

40. The non-transitory computer-readable storage medium of claim 31, wherein the stored processor-executable instructions are configured to cause a processor of a text message capable wireless device to perform operations further comprising:

determining whether the incoming telephone call is answered;

determining whether a number of rings associated with the incoming telephone call satisfies a condition when the incoming telephone call is not answered; and performing the operation of determining whether the user is unavailable to receive when the number of rings satisfies the condition.

* * * * *